| (12) | United States Patent<br>Sugawara | (10) Patent No.: US 11,281,049 B2<br>(45) Date of Patent: Mar. 22, 2022 |
|---|---|---|

(54) PHASE DIFFERENCE COMPENSATING ELEMENT, LIQUID CRYSTAL DISPLAY DEVICE, AND PROJECTION-TYPE IMAGE DISPLAY DEVICE

(71) Applicant: Dexerials Corporation, Tokyo (JP)

(72) Inventor: Junichi Sugawara, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 17/059,800

(22) PCT Filed: May 23, 2019

(86) PCT No.: PCT/JP2019/020474
§ 371 (c)(1),
(2) Date: Nov. 30, 2020

(87) PCT Pub. No.: WO2019/230559
PCT Pub. Date: Dec. 5, 2019

(65) Prior Publication Data
US 2021/0208440 A1 Jul. 8, 2021

(30) Foreign Application Priority Data
May 31, 2018 (JP) .............................. JP2018-104297

(51) Int. Cl.
*G02F 1/13363* (2006.01)
*G03B 21/00* (2006.01)

(52) U.S. Cl.
CPC ....... *G02F 1/13363* (2013.01); *G03B 21/006* (2013.01); *G02F 2413/02* (2013.01)

(58) Field of Classification Search
None
See application file for complete search history.

(56) References Cited

U.S. PATENT DOCUMENTS

| 6,206,065 B1 | 3/2001 | Robbie et al. |
| 2010/0026918 A1* | 2/2010 | Nakagawa ............. G03B 33/12 349/5 |

(Continued)

FOREIGN PATENT DOCUMENTS

| CN | 101558337 A | 10/2009 |
| CN | 101802663 A | 8/2010 |

(Continued)

OTHER PUBLICATIONS

International Search Report issued in International Application No. PCT/JP2019/020474, dated Aug. 13, 2019 (5 pages).

(Continued)

*Primary Examiner* — Ryan Crockett
(74) *Attorney, Agent, or Firm* — Osha Bergman Watanabe & Burton LLP

(57) ABSTRACT

In order to provide a phase difference compensating element that has durability and that can improve contrast in a liquid crystal display with high precision while suppressing high costs and long lead times, the present invention is provided with, on a substrate, a first optical anisotropic layer that acts as a C-plate and a second optical anisotropic layer that includes a birefringent film formed by depositing an inorganic material, wherein the birefringent film included in the second optical anisotropic layer is fabricated using specific processes.

4 Claims, 5 Drawing Sheets

(56) References Cited

U.S. PATENT DOCUMENTS

| | | | |
|---|---|---|---|
| 2010/0231835 A1* | 9/2010 | Nakagawa | G03B 21/2073 |
| | | | 349/117 |
| 2011/0069377 A1* | 3/2011 | Wu | G02B 1/007 |
| | | | 359/356 |
| 2015/0192723 A1* | 7/2015 | Takahashi | G02F 1/133634 |
| | | | 359/489.03 |
| 2016/0266282 A1* | 9/2016 | Oowada | G02B 1/18 |
| 2018/0164642 A1* | 6/2018 | Koike | G02F 1/0063 |
| 2021/0165151 A1* | 6/2021 | Sugawara | G02F 1/133502 |

FOREIGN PATENT DOCUMENTS

| | | | |
|---|---|---|---|
| CN | 105659124 A | 6/2016 | |
| JP | H03035201 A | 2/1991 | |
| JP | 2002509188 A | 3/2002 | |
| JP | 2006171327 A | 6/2006 | |
| JP | 2007084880 A | 4/2007 | |
| JP | 2007086406 A | 4/2007 | |
| JP | 2009075459 A | 4/2009 | |
| JP | 2009145863 A | 7/2009 | |
| JP | 2015082010 A | 4/2015 | |
| WO | 2008081919 A1 | 7/2008 | |

OTHER PUBLICATIONS

Written Opinion issued in International Application No. PCT/JP2019/020474; dated Aug. 13, 2019 (5 pages).
Office Action issued in Chinese Application No. 201980032717.5; dated Nov. 24, 2021 (13 pages).

* cited by examiner

PHASE DIFFERENCE COMPENSATING ELEMENT, LIQUID CRYSTAL DISPLAY DEVICE, AND PROJECTION-TYPE IMAGE DISPLAY DEVICE

TECHNICAL FIELD

The present invention relates to a phase difference compensating element, a liquid crystal display device, and a projection-type image display device.

BACKGROUND ART

In recent years, an optical compensation technique employing a phase difference compensating element has been used in liquid crystal display devices in order to improve contrast characteristics and viewing angle characteristics. As such a phase difference compensating element, for example, a phase difference compensating element in which: a negative C-plate formed by alternately laminating thin films of high refractive index and low refractive index through vapor deposition of dielectric materials; and an O-plate formed of an obliquely vapor-deposited film having at least two-layer construction are laminated has been proposed (see Patent Document 1).

However, the negative C-plate disclosed in Patent Document 1 develops a phase difference through structural birefringence resulting from alternate lamination of high refractive index layers of the same film thickness and low refractive index layers of the same film thickness defined based on a ratio of optical film thicknesses of two types of vapor deposited films having different refractive indexes being defined. This requires lamination of at least 80 layers in total and an antireflective film being separately provided, which may lead to an increase in cost and lead time.

As another phase difference compensation technique, a method of optically compensating by means of two wave plates formed from obliquely vapor-deposited films has been proposed (see Patent Document 2). The optical compensation method disclosed in Patent Document 2 rotates the two wave plates in an in-plane direction to adjust the related angle to be optimum, thereby improving contrast.

However, the optical compensation method disclosed in Patent Document 2 requires two wave plates and a rotation mechanism for rotating the two wave plates, which may lead to an increase in cost and installation space.

As still another phase difference compensation technique, a liquid crystal display device has been proposed that is provided with a phase difference compensating plate including at least two compensation layers being bonded with one another in such a way that a value of phase difference and an in-plane direction of an optical axis are different from each other (see Patent Document 3).

However, the phase difference compensating plate included in the liquid crystal display device disclosed in Patent Document 3 requires an adhesive for bonding of the two compensation layers and has a problem in durability. Furthermore, two substrates are required, leading to an increase in cost.

Patent Document 1: Japanese Unexamined Patent Application, Publication No. 2006-171327
Patent Document 2: Japanese Unexamined Patent Application, Publication No. 2009-145863
Patent Document 3: PCT International Publication No. WO2008/081919

DISCLOSURE OF THE INVENTION

Problems to be Solved by the Invention

The present invention has been made in view of the aforementioned background art, and has an objective of providing a phase difference compensating element that has durability and that can improve contrast in a liquid crystal display with high precision while suppressing high cost and long lead time.

Means for Solving the Problems

The present inventor has found that the aforementioned problem can be solved by providing, on a substrate, a first optical anisotropic layer that acts as a C-plate and a second optical anisotropic layer that includes a birefringent film formed by depositing an inorganic material, wherein the birefringent film included in the second optical anisotropic layer is fabricated using specific processes, thus leading to completion of the present invention.

According to an aspect of the present invention, a phase difference compensating element that compensates a phase difference in a liquid crystal cell includes: a transparent substrate; a first optical anisotropic layer that acts as a C-plate; and a second optical anisotropic layer that includes a birefringent film formed by depositing an inorganic material, in which, in the birefringent film included in the second optical anisotropic layer, an angle formed between a deposition direction of the inorganic film and a surface of the transparent substrate is not 90°, and a direction of a line segment obtained by projecting the deposition direction of the inorganic film onto the surface of the transparent substrate shifts continuously by at least 15°.

The birefringent film may be an obliquely vapor-deposited film.

The inorganic material may be an oxide containing at least one selected from the group consisting of Si, Nb, Zr, Ti, La, Ta, Al, Hf, and Ce.

The first optical anisotropic layer may be a multilayer dielectric films including at least two types of films having different refractive indexes and may have a reflection prevention function and a C-plate function.

The dielectric films may contain at least one selected from the group consisting of $TiO_2$, $SiO_2$, $Ta_2O_5$, $Al_2O_3$, $CeO_2$, $ZrO_2$, $ZrO$, $Nb_2O_5$, and $HfO_2$.

The phase difference compensating element may further include a matching layer between the transparent substrate and the second optical anisotropic layer.

The phase difference compensating element may further include a protective layer constituted of a dielectric film on the second optical anisotropic layer.

The transparent substrate may be any one of glass, quartz, crystal, and sapphire.

According to another aspect of the present invention, liquid crystal display device includes a VA mode liquid crystal cell and the aforementioned phase difference compensating element.

According to still another aspect of the present invention, a projection-type image display device includes: a light source that emits light; a projection optical system that projects modulated light; and the liquid crystal display device disposed on an optical path between the light source and the projection optical system.

Effects of the Invention

According to the present invention, a phase difference compensating element can be provided that has durability and that can improve contrast in a liquid crystal display with high precision while suppressing high costs and long lead times.

PREFERRED MODE FOR CARRYING OUT THE INVENTION

Hereinafter, embodiments of the present invention are described with reference to the drawings.

[Phase Difference Compensating Element]

The phase difference compensating element according to the present invention compensates a phase difference in a liquid crystal cell, and includes: a transparent substrate; a first optical anisotropic layer that acts as a C-plate; and a second optical anisotropic layer that includes a birefringent film composed of an inorganic material. In the birefringent film included in the second optical anisotropic layer, an angle formed between a deposition direction of the inorganic film and a surface of the transparent substrate is not 90°, and a direction of a line segment obtained by projecting the deposition direction of the inorganic film onto the surface of the transparent substrate shifts continuously by at least 15°.

Figure 1:
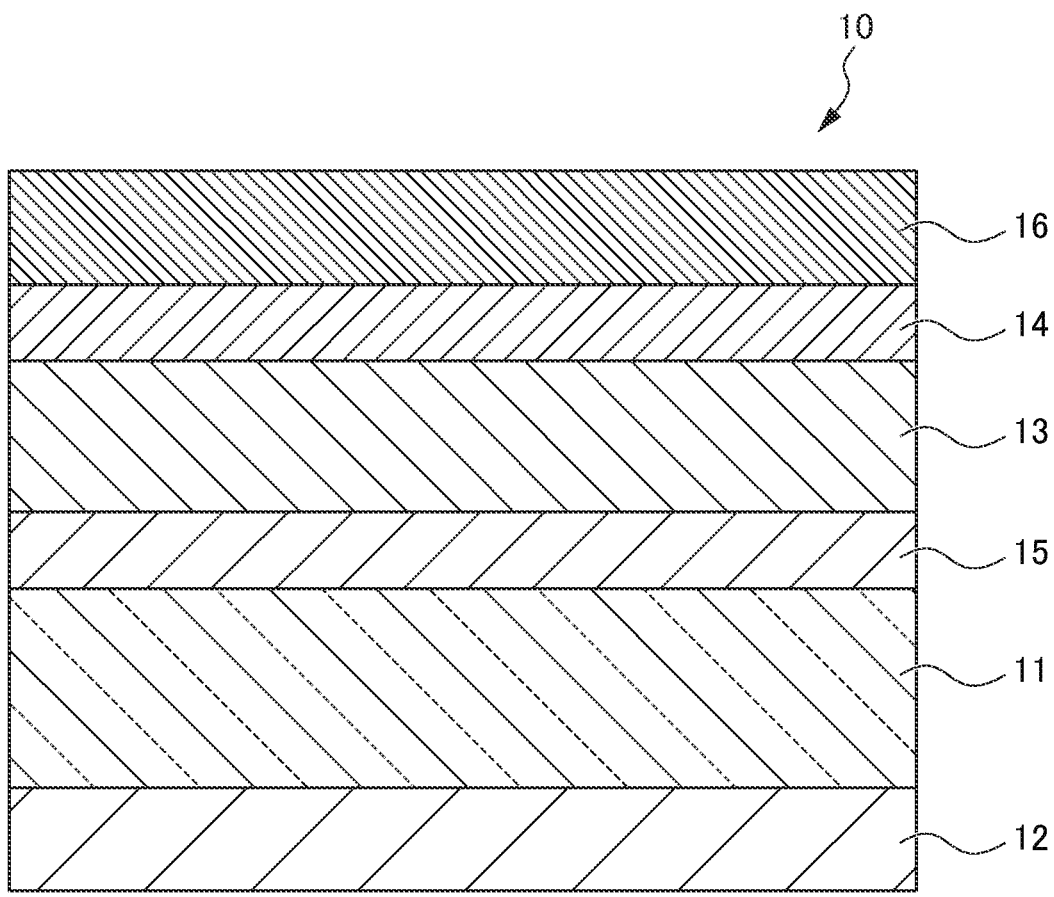
FIG. 1 is a schematic cross-sectional view of a phase difference compensating element according to an embodiment of the present invention.

FIG. 1 is a schematic cross-sectional view of a phase difference compensating element 10 according to an embodiment of the present invention. As shown in FIG. 1, the phase difference compensating element 10 according to the present embodiment includes a transparent substrate 11, a first optical anisotropic layer 12, a second optical anisotropic layer 13, a protective layer 14, a matching layer 15, and an antireflective layer 16. It is to be noted that the present invention is only required to include at least the transparent substrate, the first optical anisotropic layer, and the second optical anisotropic layer.

[Transparent Substrate]

The transparent substrate is not particularly limited as long as the substrate is transparent to light in the desired used wavelength band. The material of the transparent substrate is exemplified by quartz, crystal, sapphire, and the like. The shape of the transparent substrate is typically square, but the shape may also be appropriately selected according to the purpose. The thickness of the transparent substrate is preferably in a range of 0.1 mm to 0.3 mm, for example.

In the phase difference compensating element 10 shown in FIG. 1, the transparent substrate 11 is disposed between the first optical anisotropic layer 12 and the matching layer 15.

[First Optical Anisotropic Layer]

The first optical anisotropic layer acts as a C-plate. The first optical anisotropic layer is not particularly limited as long as the layer acts as a C-plate, but is preferably a multilayer dielectric films including at least two types of films having different refractive indexes. In addition, the first optical anisotropic layer preferably has a reflection prevention function in addition to the C-plate function. Specifically, the first optical anisotropic layer preferably acts as a C-plate while preventing reflection.

The first optical anisotropic layer is provided on a face of the transparent substrate opposite to a face on which the second optical anisotropic layer (described later) is provided.

Figure 2:
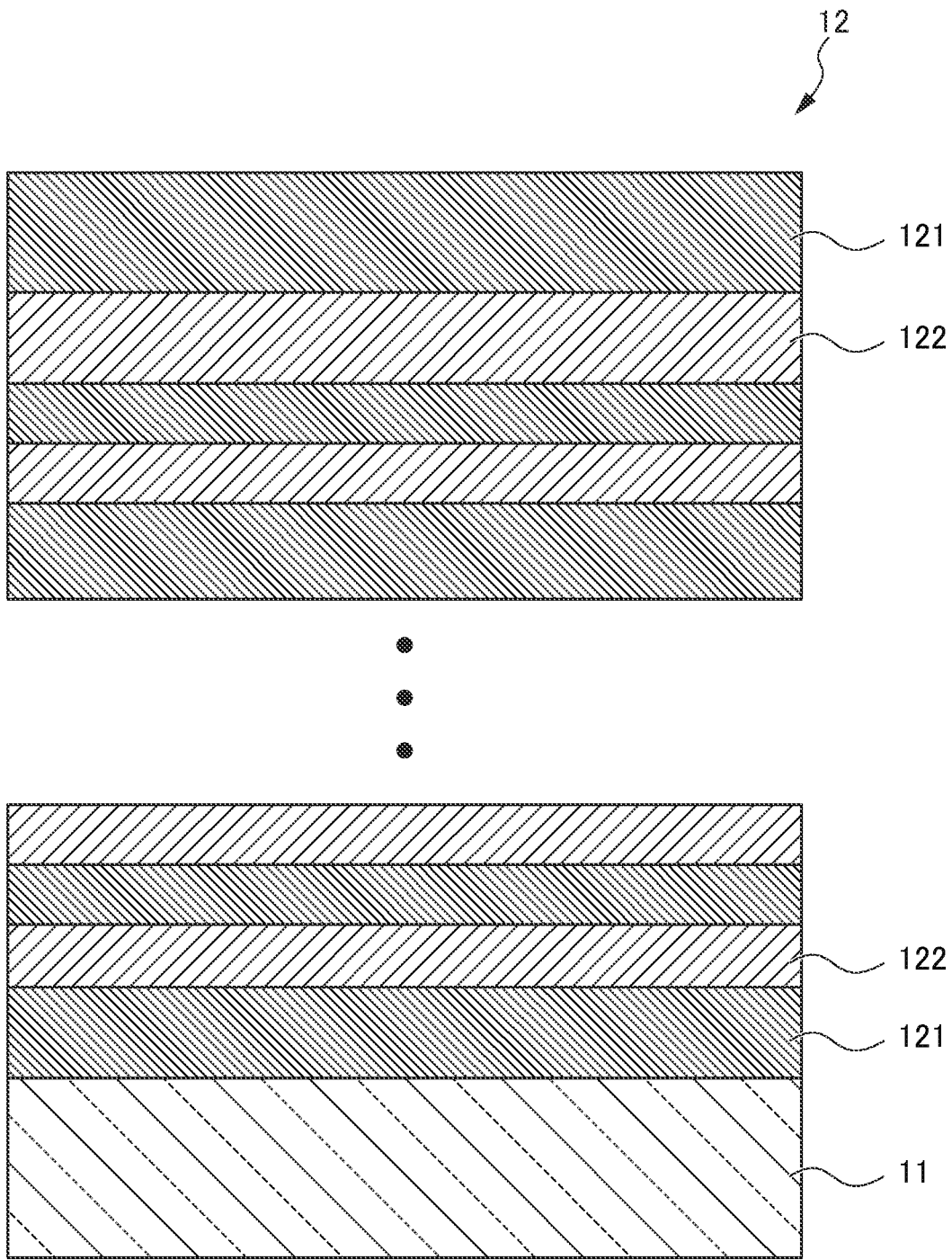
FIG. 2 is a schematic cross-sectional view of a first optical anisotropic layer according to an embodiment of the present invention.

FIG. 2 is a schematic cross-sectional view of the first optical anisotropic layer according to an embodiment of the present invention. The first optical anisotropic layer 12 shown in FIG. 2 is a multilayer film obtained by laminating at least two types of dielectric films having different refractive indexes. In the present embodiment, the first optical anisotropic layer 12 is composed of a dielectric multilayer film in which a first dielectric film 121 and a second dielectric film 122 are alternately laminated. The number of layers is not particularly limited. For example, a dielectric multilayer film of 34 layers in total in which the first dielectric film 121 and the second dielectric film 122 are alternately laminated is exemplified.

A material for the dielectric film constituted of at least two dielectrics having different refractive indexes that constitutes the first optical anisotropic layer is exemplified by an inorganic oxide containing at least one selected from the group consisting of $TiO_2$, $SiO_2$, $Ta_2O_5$, $Al_2O_3$, $CeO_2$, $ZrO_2$, $ZrO$, $Nb_2O_5$, and $HfO_2$. For example, in the first optical anisotropic layer 12 according to the embodiment shown in FIG. 2, it is preferred that the first dielectric film 121 is formed from $Nb_2O_5$ which has a relatively high refractive index, while the second dielectric film 122 is formed from $SiO_2$ which has a relatively low refractive index.

In the present invention, in the case in which the first optical anisotropic layer is composed of a multilayer dielectric films including at least two types of films having different refractive indexes, since the dielectric layers have different film thicknesses, the first optical anisotropic layer functions as a C-plate due to the structural birefringence, and as an antireflective film due to the interference of light (multiple reflection). In addition, the number of laminated layers can be relatively reduced.

The first optical anisotropic layer is preferably designed such that a phase difference applied to obliquely incident light that forms an angle of 15° with respect to a direction orthogonal to the surface of the transparent substrate (substrate normal direction) is 1.0 nm to 25.0 nm. A practical first optical anisotropic layer is obtained by differentiating the film thicknesses of the dielectric films and optimizing the number of laminated layers such that the phase difference falls within this range. Therefore, the film thickness of the first optical anisotropic layer is a thickness required to obtain a desired phase difference, and not particularly limited.

[Second Optical Anisotropic Layer]

The second optical anisotropic layer in the phase difference compensating element according to the present invention includes a birefringent film formed by depositing an inorganic material. The first optical anisotropic layer and the second optical anisotropic layer have a function of compensating the phase difference and thus contribute to improvement of contrast in the phase difference compensating element according to the present invention.

In the phase difference compensating element 10 shown in FIG. 1, the second optical anisotropic layer 13 is disposed between the matching layer 15 and the protective layer 14. The second optical anisotropic layer 13 includes a birefringent film.

The birefringent film included in the second optical anisotropic layer is formed through deposition in a direction that is oblique to a substrate normal line, which is a direction orthogonal to the surface of the transparent substrate (hereinafter referred to as "substrate normal direction"). The second optical anisotropic layer in the phase difference compensating element according to the present invention includes a birefringent film formed by depositing a inorganic material.

The birefringent film is formed through deposition in a direction that is oblique to the substrate normal line of the transparent substrate. An angle formed between the deposition direction of the inorganic film constituting the birefringent film and the surface of the transparent substrate is not 90°.

In the present invention, a method for making the angle formed between the deposition direction of the inorganic film constituting the birefringent film and the surface of the transparent substrate not 90° is preferably, for example, a method of forming an obliquely vapor-deposited film by arranging a vapor deposition source at a position oblique to the substrate normal line and obliquely vapor-depositing by the vapor deposition source.

Figure 3:
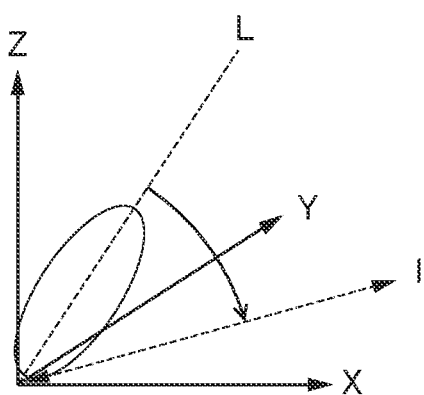
FIG. 3 is a figure showing a direction of a line segment obtained by projecting liquid crystal molecules onto the surface of a transparent substrate.

FIG. 3 is a figure showing a direction of a line segment obtained by projecting liquid crystal molecules onto the surface of a transparent substrate. A direction of a line segment obtained by projecting the oblique direction L of the liquid crystal molecules onto the XY plane From the Z-axis direction perpendicular to the XY plane is the direction l of a line segment obtained by projecting the liquid crystal molecules onto the surface of the transparent substrate. It is to be noted that the phase difference compensating element according to the present invention has an advantage of eliminating the need of adjusting an angle of arrangement in an in-plane direction.

Figure 4:
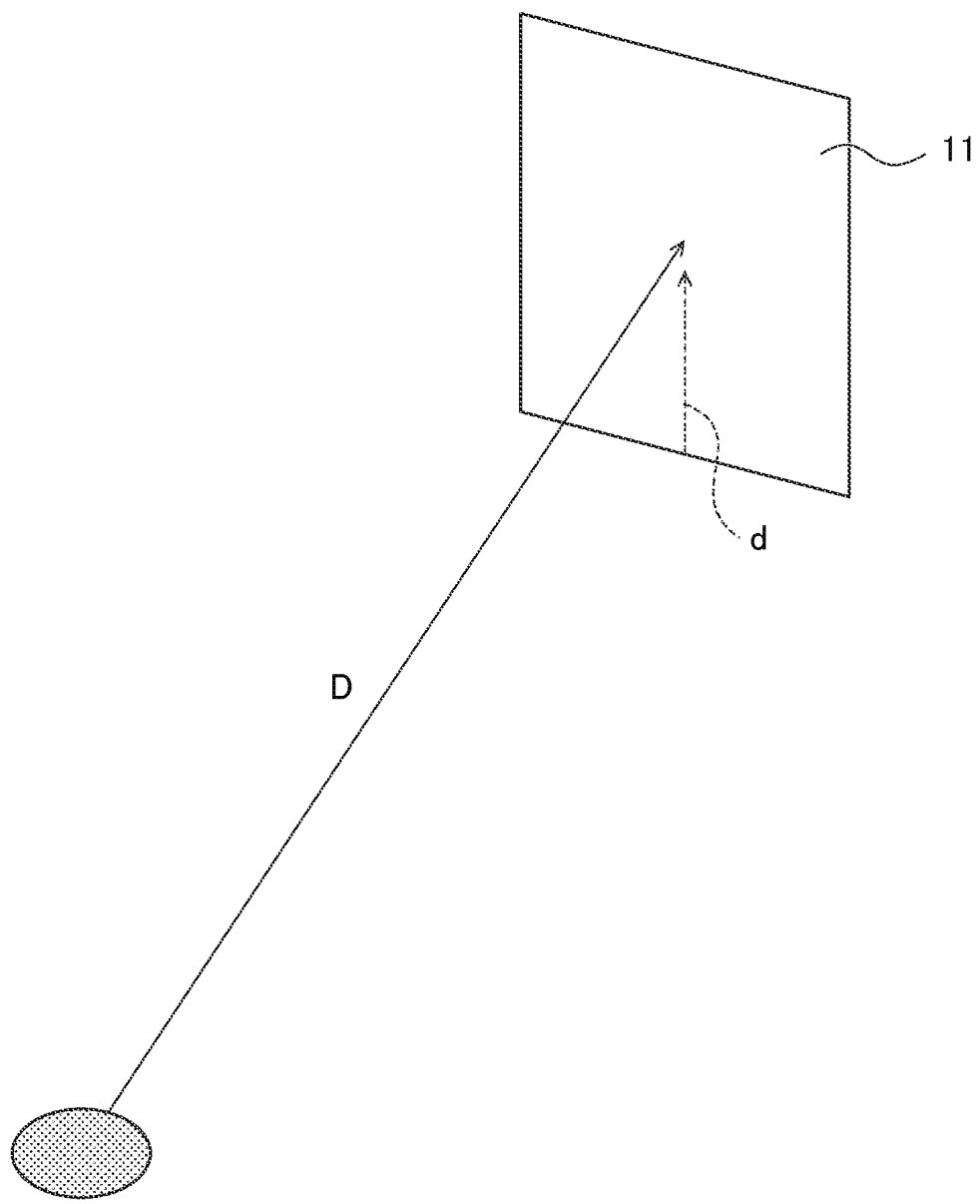
FIG. 4 is a figure showing a direction of a line segment obtained by projecting the deposition direction of a birefringent film onto the surface of the transparent substrate.

FIG. 4 is a figure showing a direction of a line segment obtained by projecting a deposition direction from the vapor deposition source toward the surface of the transparent substrate onto the surface of the transparent substrate, in the case of forming the birefringent film by oblique vapor deposition. In the case of forming the vapor-deposited film in the deposition direction D from the vapor deposition source toward the transparent substrate 11, a direction of a line segment obtained by projecting the deposition direction of the birefringent film onto the surface of the transparent substrate is indicated by d.

The birefringent film included in the second optical anisotropic layer in the phase difference compensating element according to the present invention is characterized in that a direction of a line segment obtained by projecting the deposition direction of the inorganic film onto the surface of the transparent substrate shifts continuously by at least 15°. In other words, d shown in FIG. 4 shifts continuously by at least 15°.

As used herein, "to shift continuously by at least 15°" specifically means that the position of the substrate in the in-plane direction shifts by at least 15° before and after the film formation, and that the shift in the position of the substrate in the in-plane direction during film formation is not intermittent. In the present invention, a method for shifting the direction of the line segment obtained by projecting the deposition direction of the inorganic film onto the surface of the transparent substrate continuously by at least 15° is exemplified by a method of forming the birefringent film included in the second optical anisotropic layer by oblique vapor deposition, during which the transparent substrate is continuously rotated in the in-plane direction to shift the deposition direction.

The second optical anisotropic layer includes the birefringent film formed by depositing an inorganic material. The inorganic material is preferably a dielectric material exemplified by an oxide containing at least one selected frog the group consisting of Si, Nb, Zr, Ti, La, Ta, Al, Hf, and Ce. The inorganic material is more preferably a material containing $Ta_2O_5$ as a principal component, and still more preferably a material obtained by adding 5 to 15% by mass of $TiO_2$ to $Ta_2O_5$.

The thickness of the whole second optical anisotropic layer including the birefringent, film formed by depositing the inorganic material is not particularly limited. It is to be noted that the thickness of the layer (film thickness) as referred to herein means an average film thickness.

[Matching Layer]

The matching layer is optional in the present invention, and prevents reflection at an interface between the transparent substrate and the second optical anisotropic layer. The matching layer is, for example, a dielectric multilayer film provided between the transparent substrate and the second optical anisotropic layer. The matching layer is designed such that interface reflection light between the transparent substrate and the matching layer cancels interface reflection light between the matching layer and the second optical anisotropic layer.

The matching layer 15 in the phase difference compensating element 10 shown in FIG. 1 is disposed between the transparent substrate 11 and the second optical anisotropic layer 13. Owing to the presence of the matching layer 15, reflection is further prevented in the phase difference compensating element 10.

[Protective Layer]

The protective layer is optional in the present invention, and provided for preventing warping the phase difference compensating element while improving moisture resistance of the second optical anisotropic layer. The material for the protective layer is not particularly limited as long as the material is capable of adjusting stress applied on the phase difference compensating element and contributing to improvement of moisture resistance, and is preferably a dielectric. The protective layer is exemplified by a thin film of $SiO_2$ and the like.

In the phase difference compensating element 10 shown in FIG. 1, the protective layer 14 is disposed between the second optical anisotropic layer 13 and the antireflective layer 16. In the case of providing the protective layer, the protective layer is preferably provided on the second optical anisotropic layer in the phase difference compensating element.

[Antireflective Layer]

The antireflective layer is provided as needed and has a reflection prevention function in the desired used wavelength band. The antireflective layer is obtained by laminating dielectric films. The dielectric to be used and the number of layers may be appropriately selected in accordance with desired characteristics and productivity.

In the phase difference compensating element 10 shown in FIG. 1, the antireflective layer 16 is provided in the outermost part on the side on which the second optical anisotropic layer 13, the matching layer 15, and the protective layer 14 are provided.

[Liquid Crystal Display Device]

The liquid crystal display device according to the present invention includes a liquid crystal cell and the phase difference compensating element according to the present invention described above. In the present invention, the liquid crystal cell is preferably of the VA mode.

The VA mode liquid crystal cell is of the vertical-alignment type in which liquid crystal molecules in the non-voltage applied state are aligned to be tilted in a certain direction with respect to the normal direction of the surface of the substrate. The angle of the tilt is referred to as "pretilt angle".

According to the present invention, contrast of the liquid crystal display device can be improved and a sufficient optical compensation effect can be obtained due to only one phase difference compensating element disposed on the optical path with the liquid crystal cell, between a light-incident side polarizing plate and the liquid crystal cell, or between the liquid crystal cell and a light-emitting side polarizing plate, without the need of adjusting the angle of the phase difference compensating element.

[Projection-Type Image Display Device]

The projection-type image display device according to the present invention includes: a light source that emits light; a projection optical system that projects modulated light; and the liquid crystal display device described above disposed on an optical path between the light source and the projection optical system.

The light source emits light, and is exemplified by an ultra-high pressure mercury lamp that emits white light. The projection optical system projects modulated light, and is exemplified by a projection lens that projects modulated light onto a screen. The liquid crystal display device including the VA mode liquid crystal cell and the phase difference compensating element according to the present invention is disposed on the optical path between the light source and the projection optical system.

It is to be noted that the present invention is not limited to the foregoing embodiment, and includes modifications and improvements made within such a scope that the object of the present invention can be attained.

EXAMPLES

Hereinafter, Examples of the present invention are described; however, the present invention is not in any way limited to these Examples.

Example 1

[Production of Phase Difference Compensating Element]
(Formation of First Optical Anisotropic Layer)

The first optical anisotropic layer was formed by alternately laminating 40 layers of $Nb_2O_5$ and $SiO_2$ by sputtering on one face of a glass substrate (average thickness: 0.7 mm). The phase difference to be applied was adjusted to be 9.0 nm with respect to the incident light that is oblique by 15° from the normal direction of the substrate.
(Formation of Matching Layer)

The matching layer was formed by alternately laminating 5 layers of $Nb_2O_5$ and $SiO_2$ by sputtering on the other face of the glass substrate.
(Formation of Second Optical Anisotropic Layer)

Figure 5:
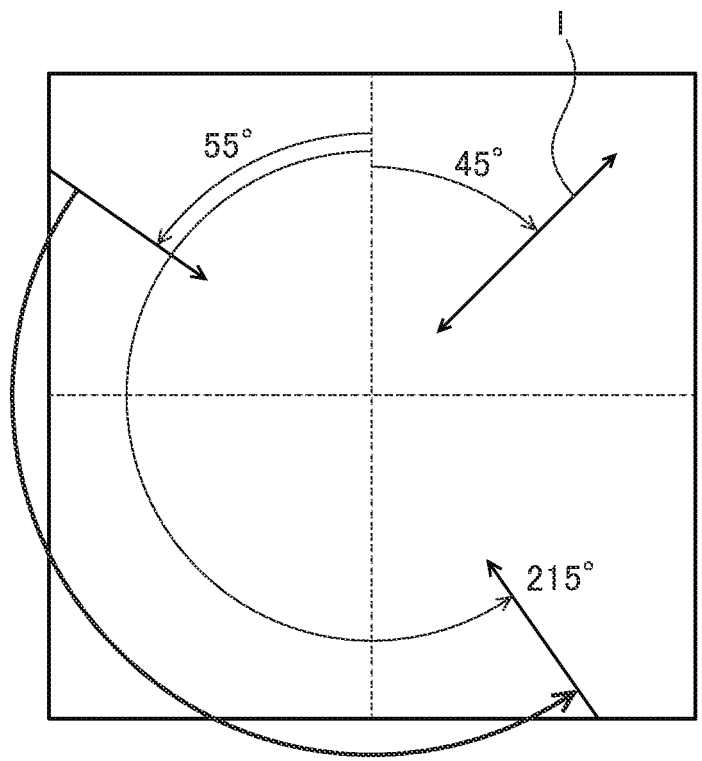
FIG. 5 is a figure showing the deposition direction of a birefringent film of Example 1.

A birefringent film was formed on the matching layer by using a mixture of $Ta_2O_5$ and $TiO_2$ as a vapor deposition material, while continuously shifting the deposition direction of the oblique vapor deposition from 55° to 215° as shown in FIG. 5. For the vapor deposition, a vapor deposition source was arranged at a position oblique by 70° with respect to the substrate normal line.

After the vapor deposition, an annealing process was carried out at 300° C. in order to stabilize characteristics. It is to be noted that, in Example 1, the direction l of a line segment obtained by projecting liquid crystal molecules of the liquid crystal cell onto the surface of the transparent substrate is 45°.
(Formation of Protective Layer)

The protective layer was formed by forming a $SiO_2$ film on the annealed second optical anisotropic layer, by the plasma CVD method using TEOS (tetraethoxysilane) gas and $O_2$.
(Formation of Antireflective Layer)

Subsequently, the antireflective layer was formed by alternately laminating seven layers of $Nb_2O_5$ and $SiO_2$ by sputtering on the protective layer, thus obtaining a final phase difference compensating element.

[Contrast Measurement]

The phase difference compensating element obtained in Example 1 was installed in a projection-type image display device, and contrast was measured. The result is shown in Table 1.

TABLE 1

| | Example 1 | Reference (With no phase difference compensating element) |
|---|---|---|
| Contrast | 630.4 | 398.8 |

The phase difference compensating element according to the present invention is capable of improving contrast through appropriate compensation of the phase difference in a liquid crystal cell. In addition, the need for adjustment of the angle and the like of the phase difference compensating element is eliminated, enabling a great reduction in an installation space. Furthermore, due to using the inorganic materials, the phase difference compensating element is superior in durability.

EXPLANATION OF REFERENCE NUMERALS

10 Phase difference compensating element
11 Transparent substrate
12 First optical anisotropic
121 First dielectric film
122 Second dielectric film
13 Second optical anisotropic layer
14 Protective layer
15 Matching layer
16 Antireflective layer
L Oblique direction of liquid crystal molecules
l direction of line segment obtained by projecting liquid crystal molecules onto surface of transparent substrate
D deposition direction of birefringent film
d direction of line segment obtained by projecting deposition direction of birefringent film onto surface of transparent substrate

The invention claimed is:
1. A phase difference compensating element that compensates a phase difference in a liquid crystal cell, comprising:
a transparent substrate;
a first optical anisotropic layer that is formed on one surface of the transparent substrate and acts as a C-plate; and a matching layer, a second optical anisotropic layer, a protective layer, and an antireflective layer that are sequentially formed over another surface of the transparent substrate, wherein the first optical anisotropic layer is a multilayer film including at least one $Nb_2O_5$ film and at least one $SiO_2$ film that are alternately laminated, the first optical anisotropic layer being configured such that a phase difference applied to obliquely incident light that forms an angle of 15° with respect to a direction orthogonal to the surface of the transparent substrate is 1.0 nm to 25.0 nm, wherein the matching layer is a multilayer film including at least one $Nb_2O_5$ film and at least one $SiO_2$ film that are alternately laminated, wherein the second optical anisotropic layer is a birefringent film formed by way of oblique vapor deposition of a mixture of $Ta_2O_5$ and $TiO_2$, wherein a direction of a line segment obtained by projecting a deposition direction of the oblique vapor deposition onto the surface of the transparent substrate is varied continuously by at least 15°, wherein the protective layer is a $SiO_2$ film, and wherein the antireflective layer is a multilayer film including at least one $Nb_2O_5$ film and at least one $SiO_2$ film that are alternately laminated.

2. The phase difference compensating element according to claim 1, wherein the transparent substrate is any one of glass, quartz, crystal, and sapphire.

3. A liquid crystal display device comprising:
a liquid crystal cell; and
the phase difference compensating element according to claim 1.

4. A projection-type image display device comprising:
a light source that emits light;
a projection optical system that projects modulated light; and
the liquid crystal display device according to claim 3 disposed on an optical path between the light source and the projection optical system.

* * * * *